(12) United States Patent
Chu

(10) Patent No.: US 9,828,936 B2
(45) Date of Patent: Nov. 28, 2017

(54) APPARATUS FOR IMPROVING ENGINE AIR FLOW

(71) Applicants: HYUNDAI MOTOR COMPANY, Seoul (KR); Kia Motors Corporation, Seoul (KR)

(72) Inventor: Dong Ho Chu, Ansan-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 86 days.

(21) Appl. No.: 14/924,045

(22) Filed: Oct. 27, 2015

(65) Prior Publication Data

US 2016/0333821 A1 Nov. 17, 2016

(30) Foreign Application Priority Data

May 13, 2015 (KR) .......................... 10-2015-0066624

(51) Int. Cl.
 *F02F 1/00* (2006.01)
 *F02F 1/42* (2006.01)
 *F02M 35/10* (2006.01)

(52) U.S. Cl.
 CPC ....... *F02F 1/425* (2013.01); *F02M 35/10262* (2013.01)

(58) Field of Classification Search
 CPC .................... F02F 1/425; F02M 35/10262
 See application file for complete search history.

(56) References Cited

U.S. PATENT DOCUMENTS

| 6,478,008 | B2 * | 11/2002 | Wolters | F02F 1/4242 |
|  |  |  |  | 123/306 |
| 6,877,478 | B2 * | 4/2005 | Kim | F02B 31/06 |
|  |  |  |  | 123/306 |
| 6,886,516 | B2 * | 5/2005 | Harui | F02B 31/04 |
|  |  |  |  | 123/184.52 |
| 7,032,560 | B2 * | 4/2006 | Katou | F02B 31/08 |
|  |  |  |  | 123/193.5 |

FOREIGN PATENT DOCUMENTS

| CN | 104121124 A | * 10/2014 |
| JP | H8-14407 | 1/1996 |
| JP | 2011-231688 | 11/2011 |
| KR | 10-1997-0016057 | 4/1997 |
| KR | 20-1999-0029209 | 7/1999 |
| KR | 10-0499617 | 6/2005 |
| KR | 10-0646342 | 11/2006 |
| KR | 20-2010-0011032 | 11/2010 |
| KR | 10-1459932 | 11/2014 |

* cited by examiner

*Primary Examiner* — Lindsay Low
*Assistant Examiner* — Kevin A Lathers
(74) *Attorney, Agent, or Firm* — Brinks Gilson & Lione

(57) ABSTRACT

The present disclosure provides an apparatus for improving engine air flow including: a combination recess which is formed at an intake port of a cylinder head and is extended toward a combustion chamber along an air flow path at a position combined with an intake manifold; a fixing body which is fit-inserted to and combined to the combination recess; and a plate an end of which is combined to the fixing body on the flow path of the intake port and which guides the air flow flowing into the intake port.

11 Claims, 6 Drawing Sheets

APPARATUS FOR IMPROVING ENGINE AIR FLOW

CROSS-REFERENCE TO RELATED APPLICATION

This application claims the benefit of Korean Patent Application No. 10-2015-0066624, filed on May 13, 2015, which is incorporated herein by reference in its entirety.

FIELD

The present disclosure relates to an apparatus for improving engine air flow.

BACKGROUND

The statements in this section merely provide background information related to the present disclosure and may not constitute prior art.

As the recognition of the consumers about vehicles has been changed, the most popular condition of vehicles is whether the vehicles can realize high fuel ratio and high output.

The engine combustion ratio is raised to satisfy the requirement of the consumers, and to this end, technologies have been developed which enable the rapid fuel mixing and high combustion efficiency at the time of fuel injection by intentionally forming a turbulent flow by generating an eddy flow in the sucked air.

Conventional suction apparatus for generating a tumble disclosed in KR10-1459932 B1 is designed for that purpose and includes: a cylinder head through which an intake port penetrates; a plate combined between the cylinder head and an intake manifold; an insertion member which is fixed to the plate and inserted into the intake port so as to divide the inner space of the intake port into upper part and lower part; and a flow adjustment means which is installed at an end of the intake manifold and which guides the flow direction of the sucked air flowing in from the intake manifold into the upper inner space of the intake port divided by the insertion member; wherein a partition wall is formed at the rear end of the intake port so as to divide the inner space of the rear end of the intake port into two sides; and a recess is formed at the middle of end of the insertion member so that the recess is fitted into the partition wall in a rectangular shape.

However, even according to such conventional technology, separate support means which supports the insertion member in the inner space of the intake port is not provided thereby to cause the instability at the time of generation of eddy flow, and since it is not the method for the insertion member to be separately combining to the intake port but the method for the insertion member to be collectively fixed by a plate, inconvenience is caused in post management such as that separate replacement is impossible upon occurrence of poor condition.

SUMMARY

The present disclosure provides an apparatus for improving engine air flow comprising: a combination recess which is formed at an intake port of a cylinder head and is extended toward a combustion chamber along an air flow path from a position where the intake port combines with an intake manifold; a fixing body which is fit-inserted to and combined with the combination recess; and a plate having an end and configured to guide an air flow flowing into the intake port. In particular, the end of the plate is combined with the fixing body on the air flow path of the intake port.

In one embodiment, the combination recesses are provided in a pair and are respectively formed in both side walls of the intake port so as to face to each other.

In another embodiment, the fixing bodies are provided in a pair and are inserted into the pair of combination recesses, and both side ends of the plate are each combined to the pair of combination recesses.

In still another embodiment, the fixing body is a block including an outer circumferential surface made of elastic material, and has a predetermined length along the combination recess, and an insertion protrusion may be formed at the outer circumferential surface along a longitudinal direction of the fixing body.

In yet another embodiment, the insertion protrusion formed at the outer circumferential surface of the fixing body is formed so that the distance from a center of the fixing body to an end of the insertion protrusion is longer than the distance from the center of the fixing body to the inner wall of the combination recess.

In still yet another embodiment, at least one contact protrusion protruding toward the intake manifold in the axial direction of the fixing body is formed at the end facing the intake manifold among the fixing body, and the contact protrusion is formed to protrude to outside of the cylinder head so as to be pressed at the time of combination of the intake manifold and the cylinder head.

In a further embodiment, the fixing body includes an elastic material, and the end of the fixing body has the contact protrusion and is made of a material softer than the remaining part of the fixing body.

In another further embodiment, the contact protrusion is made of a rubber material and the remaining part of the fixing body can be made of a plastic material.

In still another further embodiment, the entire fixing body is made of the rubber material.

In yet another further embodiment, plural insertion protrusions are provided along the circumferential surface of the fixing body.

In still yet another further embodiment, an insertion recess is formed at the end of the fixing body along an axial direction of the fixing body, the end of the fixing body faces the intake manifold, and a pressing protrusion elastically protruding to the intake manifold is provided at the insertion recess.

In a still further embodiment, an elastic body which presses the pressing protrusion to the intake manifold is provided in the insertion recess.

It is understood that the term "vehicle" or "vehicular" or other similar term as used herein is inclusive of motor vehicles in general such as passenger automobiles including sports utility vehicles SUV, buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles e.g. fuels derived from resources other than petroleum. As referred to herein, a hybrid vehicle is a vehicle that has two or more sources of power, for example both gasoline-powered and electric-powered vehicles.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
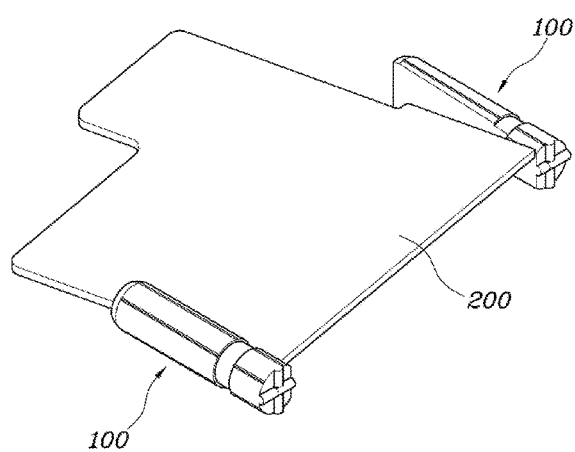
FIG. 1A is a constructional drawing of an apparatus for improving engine air flow according to a first embodiment of the present disclosure.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure is intended to cover not only the exemplary embodiments, but also various alternatives, modifications, equivalents and other embodiments, which may be included within the spirit and scope of the present disclosure as defined by the appended claims.

Figure 4:
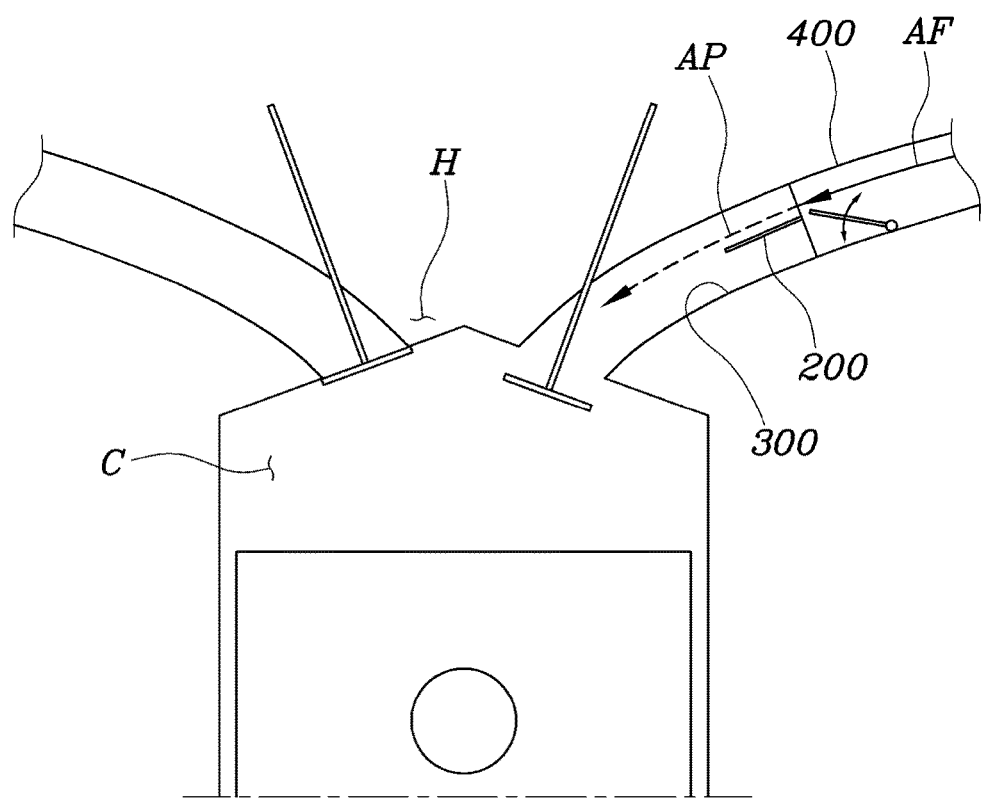
FIG. 4 is a conceptual drawing of an engine applied with the embodiments of the present disclosure.

Hereinafter it may be desirable to refer FIG. 4 to understand each embodiment more easily.

FIG. 1A is a constructional drawing of an apparatus for improving engine air flow according to a first embodiment of the present disclosure, and the apparatus for improving engine air flow includes: a combination recess 310 which is formed at an inner wall of an intake port 300 of a cylinder head H and is extended toward a combustion chamber C along an air flow path AP at a position where the intake port 300 combines with an intake manifold 400; a fixing body 100 which includes an elastic material and is inserted to and combined to the combination recess 310; and a plate 200 an end of which is combined to the fixing body 100 on the air flow path AP of the intake port 300 and which guides an air flow flowing AF into the intake port 300.

An assembly composed of the plate 200 and the fixing body 100 is fixed to the intake port 300 by being inserted and combined to the combination recess 310, and when the air flowing in along the contour of the plate 200 passes the plate 200, the flow becomes a turbulent flow so as to improve the mixing and combustion of the fuel in the cylinder.

Figure 1B:
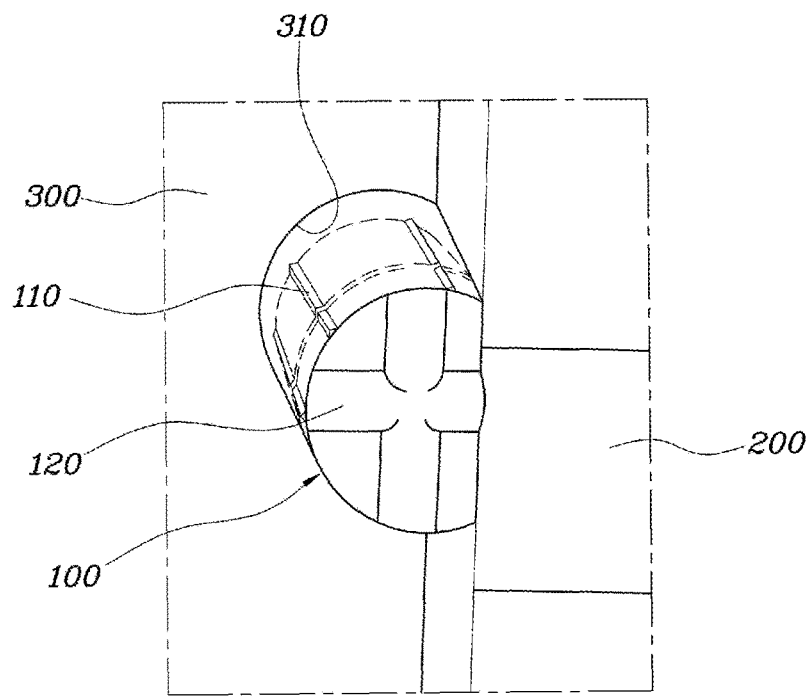
FIGS. 1B and 1C are enlarged views respectively of areas of FIG. 1A.
Figure 1C:
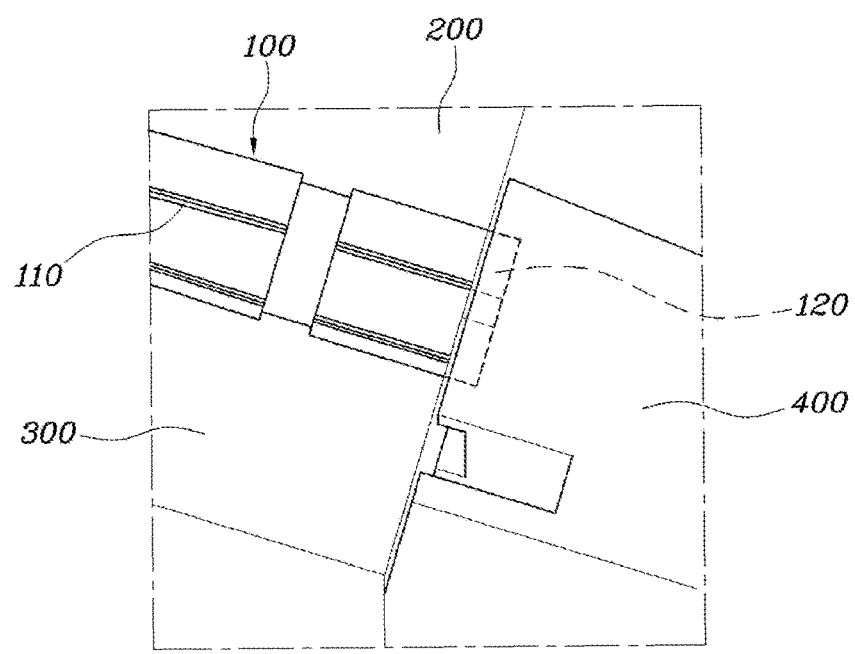

Specifically, FIG. 1A shows the combination of the plate 200 and the fixing body 100, FIG. 1B shows an end of the fixing body 100 facing the intake manifold while the fixing body 100 is inserted and combined to the combination recess 310, and FIG. 1C shows the combination of the intake port 300 and the intake manifold 400 while the fixing body 100 is inserted and combined to the combination recess 310.

The combination recesses 310 are provided in a pair and are respectively formed at both side walls of the intake port 300 so as to face each other, and as shown in FIG. 1A, the fixing bodies 100 are also provided in a pair and are inserted into the pair of combination recesses 310, and both side ends of the plate 200 are each combined to the pair of combination recesses 310. The combination recess 310 may be formed in such a way that the intake manifold 400 side is opened and the fixing body 100 can be inserted through the opening.

The combination recess 310 can be formed at any place among the wall of the inner circumferential surface of the intake port 300, however, the combination recess 310 may be provided at each of both side walls of the inner circumferential surface of the intake port 300 so that the plate 200 is parallel to the pair of suction valves.

Meanwhile, the combination recess 310 can be formed to match the contour of the fixing body 100, and the fixing body 100 may have a variety of contours and may be a block of which the outer circumferential surface is made of elastic material, and has a predetermined length along the combination recess 310, and an insertion protrusion 110 may be formed at the outer circumferential surface along the length of the fixing body 100.

The fixing body 100 may be made of one material or a combination of plurality of materials. For example, the fixing body may be made of a frame combined with the plate 200 and a coating wrapping the frame and forming the outer circumference thereof, and the frame and the coating may be made of different materials or one material without division of the frame and the coating, or may be formed to form one body by combining plural materials. Or the plural materials may be applied to the fixing body 100 by being divided into independent divisions.

In addition, the insertion protrusion 110 formed on the outer circumferential surface of the fixing body 100 may be formed so that the distance from a center of the fixing body 100 to an end of the insertion protrusion 110 is longer than the distance from the center of the fixing body 100 to the inner wall of the combination recess 310, and by such construction, a force fit combination is obtained by the insertion protrusion 110 when inserting the fixing body 100 to the combination recess 310, and even after the combination, the insertion protrusion 110 continuously presses the inner wall of the combination recess 310 so as to increase the fixation and enables the rigid combination.

At least one insertion protrusion(s) 110 may be provided along the circumferential direction of the fixing body 100, and each insertion protrusion 110 may be arranged with a predetermined spacing. In one form, five insertion protrusions 110 may be formed along the circumferential surface of the fixing body 100, and may be arranged at one upper place and one lower place, and one horizontal place and one upper inclination place and one lower inclination place in an inclination direction, maybe inclined approximately 45 degree.

Of course, this is only one example, the number and spacing of the insertion protrusion 110 may be determined variously by the designer's intention and experiment so that the fixing body 100 can be stably supported.

Meanwhile, at least one contact protrusion 120 protruding toward the intake manifold 400 in the axial direction of the fixing body 100 is formed at the end facing the intake manifold among the fixing body 100, and the contact protrusion 120 is formed to protrude to outside of the cylinder head so as to be pressed at the time of combination of the intake manifold 400 and the cylinder head.

The contact protrusion 120 may be formed at the end section of the end facing the intake manifold of the fixing body 100, and since the contact protrusion is formed to protrude to the outside of the cylinder head, it is pressed at the time of combination of the intake manifold 400 and the cylinder head so that the fixing in the axial direction of the fixing body 100 can be stably accomplished.

In addition, the end of the fixing body 100 where the contact protrusion 120 is formed can be formed of a material softer than the remaining part of the fixing body 100, and the end of the fixing body 100 where the contact protrusion 120 is formed can be made of a rubber material and the remaining part can be made of a plastic material.

Therefore, the part where the insertion protrusion 110 is formed is made of the plastic so as to have elastic force and can maintain the rigidity, and the part where the contact protrusion 120 is formed is made of the rubber or fluoride rubber so as to improve the reduction of vibration and noise and be able to realize the rigidity in view of oil permeation, abrasion resistance, heat resistance and the like.

Of course, this is only one embodiment, the material composing the fixing body 100 can be selected from various materials.

Figure 2:
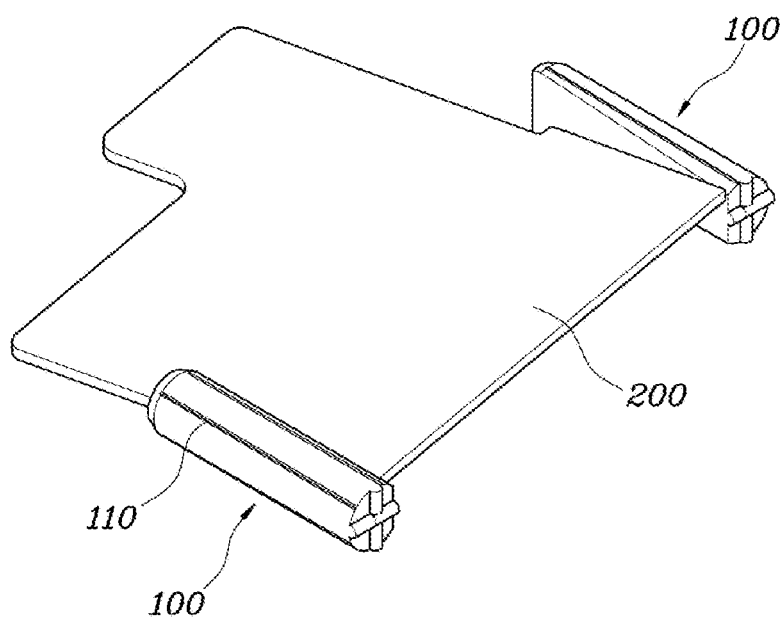
FIG. 2 is a constructional drawing of an apparatus for improving engine air flow according to a second embodiment of the present disclosure.

Meanwhile, FIG. 2 is a constructional drawing of an apparatus for improving engine air flow according to a second embodiment of the present disclosure, and the second embodiment can be composed with similar construction to the first embodiment.

However, the difference from the first embodiment is that the fixing body 100 is not of the structure in which different materials form parts but is integrated with single material or mixed material.

In this case, the entire fixing body 100 can be made of the rubber material or the fluoride rubber used in the first embodiment.

In addition, in the second embodiment, the fixing body 100 may be made of a frame combined with the plate 200 and a coating wrapping the frame and forming the outer circumference, and the frame and the coating may be made of different materials or one material without division of the frame and the coating, or may be formed to form one body by combining plural materials.

In case of being divided into a frame part and a coating part, the rubber material to the coating part may be used.

Figure 3A:
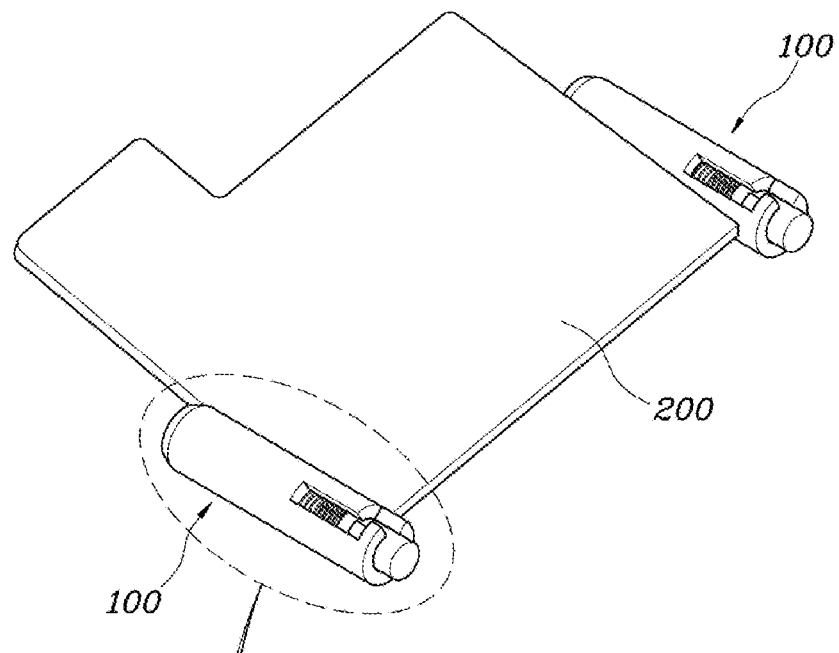
FIG. 3A is a constructional drawing of an apparatus for improving engine air flow according to a third embodiment of the present disclosure.
Figure 3D:
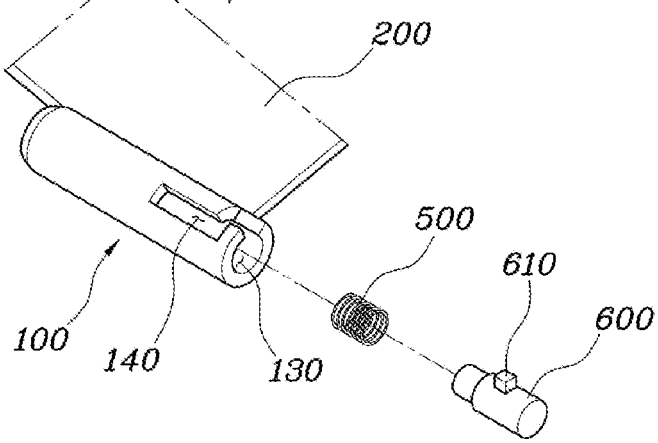
FIGS. 3B to 3D are enlarged views of an area of FIG. 3A.
Figure 3B:
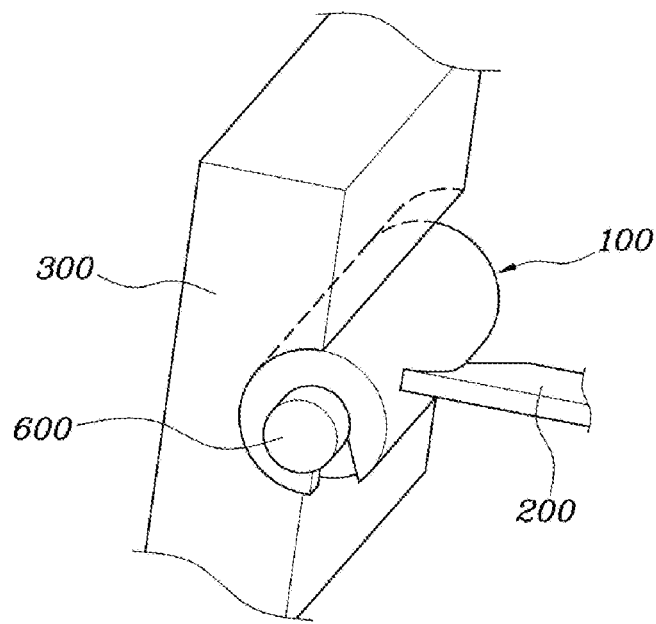
Figure 3C:
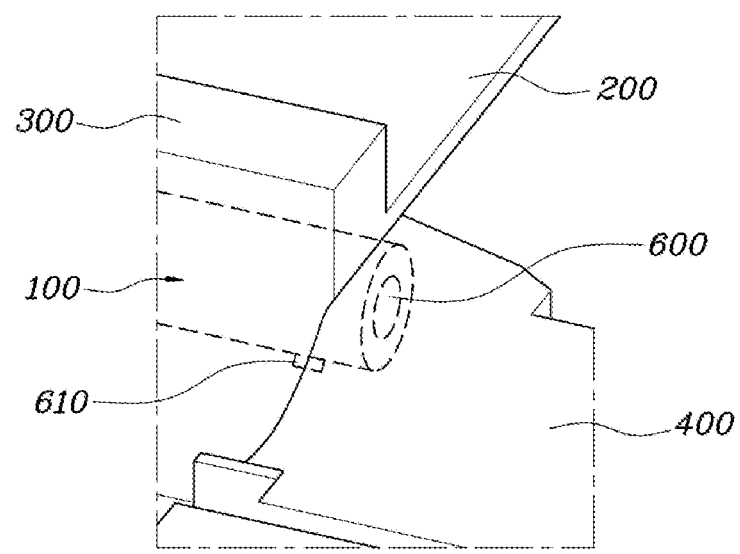

Meanwhile, FIG. 3A is a constructional drawing of an apparatus for improving engine air flow according to a third embodiment of the present disclosure, and FIGS. 3A and 3D show the combination of the plate 200 and the fixing body 100, FIG. 3B shows an end of the fixing body 100 facing the intake manifold while the fixing body 100 is inserted and combined to the combination recess 310, and FIG. 3C shows the combination of the intake port 300 and the intake manifold 400 while the fixing body 100 is inserted and combined to the combination recess 310.

Specifically, the third embodiment can be composed similar to the first embodiment. However, it is different in the structure of the fixing body 100. That is, an insertion recess 130 is formed in the axial direction of the fixing body 100 at the end facing the intake manifold of the fixing body 100, and a pressing protrusion 600 elastically protruding to the intake manifold 400 can be provided at the insertion recess 130.

The insertion protrusion 110 and the contact protrusion 120 in the first embodiment may or may not be formed, however in case of not being formed, the fixing body 100 and the combination recess 310 or the pressing protrusion 600 and the intake manifold 400 can be formed so as to contact face to face.

The pressing protrusion 600 can be inserted into the insertion recess 130 so as to be a block which slides along the insertion recess 130, an elastic body 500 which presses the pressing protrusion 600 to the intake manifold is provided in the insertion recess 130, so that the pressing protrusion 600 normally maintains the protruded condition as shown in FIG. 3B, and in case where the cylinder head and the intake manifold 400 are combined, the elastic body 500 is pressed and the pressing protrusion 600 is drawn into the insertion recess 130 so that the support in the axial direction of the fixing body 100 can be stably accomplished.

In addition, a guide recess 140 formed along the insertion recess 130 can be further formed at the fixing body 100, and a guide protrusion 610 protruding to be inserted in the guide recess 140 can be further formed at the pressing protrusion 600. The guide recess 140 can be formed at the inner wall of the insertion recess 130 or can be formed to make the insertion recess 130 and the outside of the fixing body 100 to communicate as shown in FIG. 3A. In addition, a bending part which is opened to the end facing the intake manifold after being bent approximately 90 degree or more is formed among the movement path of the guide recess 140, the pressing protrusion 600 can be inhibited or prevented from suddenly spring out by the elastic body 500 after being inserted to the insertion recess 130. Therefore, the easiness of assembly in inserting the fixing body 100 into the combination recess 310 and in their separation can be improved.

In the third embodiment, the fixing body 100 may be made of the plastic material or rubber material having elastic force similar to the first embodiment or the second embodiment so as to increase the combination force with the combination recess 310, and the material of the fixing body is not limited to these but may be determined variously according to the designer's intention.

According to the apparatus for improving engine air flow composed of the structure as described above, since the apparatus can be provided independently to the intake port for each cylinder, it can separately cope with the difference in the flow of each cylinder and can be separately replaced at the time of post replacement.

In addition, the apparatus according to the present disclosure can be directly combined to the intake port, stable support is possible and the rigidity can be maintained even at the time of occurrence of turbulent flow.

In addition, the apparatus according to the present disclosure can maintain the rigidity in the support in the axial direction of the fixing body and the direction perpendicular to the axial direction by the insertion combination method and the method of pressing by the elastic body, and can prevent the occurrence of the play between the intake port and the fixing body.

According to the apparatus for improving engine air flow composed of the structure as described above, since the apparatus can be provided independently to the intake port for each cylinder, it can separately cope with the difference in the flow of each cylinder and can be separately replaced at the time of post replacement.

In addition, the apparatus according to the present disclosure can be directly combined to the intake port, stable support is possible and the rigidity can be maintained even at the time of occurrence of turbulent flow.

In addition, it is possible for the fixing body to keep the support state about an axial direction and a perpendicular direction to the axial direction of the fixing body in rigidity and to prevent looseness between the intake port and the fixing body, by the above mentioned combination method using fit-inserting and pressing method using the elastic body.

Meanwhile, the plate 200 of the present disclosure has a stepped end toward a combustion chamber of an engine, such that it is possible for the stepped end to make swirl flows of the air in the combustion chamber.

The present disclosure has been described in detail with reference to exemplary embodiments thereof. However, it will be appreciated by those skilled in the art that changes may be made in these embodiments without departing from the principles and spirit of the present disclosure, the scope of which is defined in the appended claims and their equivalents.

What is claimed is:

1. An apparatus for improving engine air flow comprising:
   a combination recess which is formed at an intake port of a cylinder head and is extended toward a combustion chamber along an air flow path from a position where the intake port combines with an intake manifold;
   at least one fixing body which is fit-inserted to and combined with the combination recess; and
   a plate having an end and configured to guide an air flow flowing into the intake port,
   wherein the end of the plate is combined with said at least one fixing body on the air flow path of the intake port, and
   wherein said at least one fixing body is a block including an outer circumferential surface made of elastic material, and has a predetermined length along the combination recess, an insertion protrusion being formed on the outer circumferential surface along a longitudinal direction of said at least one fixing body.

2. The apparatus according to claim 1, wherein the combination recesses are provided in a pair and are respectively formed in both side walls of the intake port so as to face to each other.

3. The apparatus according to claim 2, wherein said at least one fixing body comprises at least two fixing bodies in a pair, and each of the fixing body is inserted into the pair of combination recesses, and both side ends of the plate are each combined with the pair of combination recesses.

4. The apparatus according to claim 1, wherein the insertion protrusion formed on the outer circumferential surface of said at least one fixing body is formed so that a distance from a center of said at least one fixing body to an end of the insertion protrusion is longer than a distance from a center of said at least one fixing body to an inner wall of the combination recess.

5. The apparatus according to claim 1, wherein at least one contact protrusion protruding toward the intake manifold in an axial direction of said at least one fixing body is formed at an end thereof facing the intake manifold, and said at least one contact protrusion is formed to protrude to outside of the cylinder head so as to be pressed when the intake manifold and the cylinder head are combined.

6. The apparatus according to claim 5, wherein said at least one fixing body includes an elastic material, and the end having the contact protrusion is made of a material softer than the remaining part of said at least one fixing body.

7. The apparatus according to claim 5, wherein the contact protrusion is made of a rubber material and the remaining part of said at least one fixing body is made of a plastic material.

8. The apparatus according to claim 1, wherein said at least one fixing body is entirely made of a rubber material.

9. The apparatus according to claim 1, wherein a plurality of insertion protrusions is provided along a circumferential surface of said at least one fixing body.

10. The apparatus according to claim 1, wherein an insertion recess is formed at an end of said at least one fixing body along an axial direction of said at least one fixing body, and the end of said at least one fixing body faces the intake manifold, and
    wherein a pressing protrusion elastically protruding to the intake manifold is provided at the insertion recess.

11. The apparatus according to claim 10, wherein an elastic body which presses the pressing protrusion to the intake manifold is provided in the insertion recess.

* * * * *